United States Patent
Kammann et al.

(10) Patent No.: US 6,276,128 B1
(45) Date of Patent: Aug. 21, 2001

(54) METHOD FOR MONITORING THE CONVERSION RATE OF AN EXHAUST GAS CATALYTIC CONVERTER FOR AN INTERNAL COMBUSTION ENGINE

(75) Inventors: Uwe Kammann, Warberg; Harald Loeck, Wolfsburg, both of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/446,657

(22) PCT Filed: May 13, 1998

(86) PCT No.: PCT/EP98/02805

§ 371 Date: Dec. 22, 1999

§ 102(e) Date: Dec. 22, 1999

(87) PCT Pub. No.: WO98/59159

PCT Pub. Date: Dec. 30, 1998

(30) Foreign Application Priority Data

Jun. 24, 1997 (DE) .............................................. 197 26 791

(51) Int. Cl.$^7$ ....................................................... F01N 3/00
(52) U.S. Cl. .................................. 60/274; 60/277; 60/284
(58) Field of Search ............................. 60/277, 284, 276, 60/274, 285

(56) References Cited

U.S. PATENT DOCUMENTS

| | | | |
|---|---|---|---|
| 5,419,122 | * | 5/1995 | Tabe et al. .............................. 60/274 |
| 5,428,956 | * | 7/1995 | Maus et al. ............................. 60/277 |
| 5,544,482 | * | 8/1996 | Matsumoto et al. .................... 60/279 |
| 5,592,815 | * | 1/1997 | Jelden et al. ............................ 60/274 |
| 5,600,948 | * | 2/1997 | Nakajima et al. ...................... 60/276 |
| 5,706,652 | * | 1/1998 | Sultan .................................... 60/274 |

FOREIGN PATENT DOCUMENTS

| | | |
|---|---|---|
| 41 22 787 | 1/1992 | (DE) . |
| 43 08 661 | 9/1994 | (DE) . |
| 43 08 894 | 9/1994 | (DE) . |
| 43 19 924 | 12/1994 | (DE) . |
| 44 33 988 | 4/1995 | (DE) . |
| 44 40 276 | 5/1996 | (DE) . |
| 195 41 903 | 5/1997 | (DE) . |
| WO 95/17588 | 6/1995 | (WO) . |

OTHER PUBLICATIONS

"Methods for monitoring and diagnosing the Efficiency of Catalytic Converters—A Patent oriented Survey" dated May 1998, published in Elsevier Science B.V., The Netherlands, pp. 260–263, M. Sideris.

* cited by examiner

Primary Examiner—Thomas Denion
Assistant Examiner—Binh Tran
(74) Attorney, Agent, or Firm—Cohen, Pontani, Lieberman & Pavane

(57) ABSTRACT

The invention relates to a method for improved monitoring of the conversion rate of an exhaust gas catalytic converter for an internal combustion engine. To achieve this, the temperature values determined downstream from the exhaust gas catalytic converter within a given time window is added with time interval (dt). A starting time (tA) and a time interval (dt) are influenced inter alia according to the operating mode of the internal combustion engine by taking into account fuel mass flow during a given time period. The total value arising during time interval (dt) below a curve (25) is compared with a limiting value and an error signal is outputted once a given deviation value is reached.

10 Claims, 3 Drawing Sheets

METHOD FOR MONITORING THE CONVERSION RATE OF AN EXHAUST GAS CATALYTIC CONVERTER FOR AN INTERNAL COMBUSTION ENGINE

BACKGROUND OF THE INVENTION

1. Field of the Invention

The invention relates to a method for monitoring the conversion rate of an exhaust catalyst intended for an internal combustion engine.

2. Description of the Prior Art

DE German reference 44 33 988 A1 discloses a catalyst monitoring procedure which records exhaust-gas temperatures upstream and downstream of the catalyst. The rate of heat transfer from the exhaust gas to the catalyst material is continually calculated, and from this the catalyst temperature and the rate of change of this catalyst temperature are determined. The quotient from the rate of heat transfer and the rate of change of the temperature of the catalyst is determined for a specific period of time, this period of time being chosen from the cold start of the internal combustion engine to the reaching of the conversion temperature of the catalyst. On the basis of the variation over time of the quotient, a trend is continually determined for the time up until reaching the conversion temperature. The time elapsed up until reaching the conversion temperature is compared with a threshold value for this period of time and, if the threshold value is exceeded, an error signal is output.

One of the procedures disclosed in German reference DE 42 11 092 A1 is based on a temperature estimate for the catalyst on the basis of a temperature model. In the case of that procedure, it is assumed for the model that there is a still just usable catalyst after reaching the temperature at which conversion begins and for the heat produced in the conversion. For simulating the temperature behavior of the catalyst, in that procedure it is initially assumed that the heat capacity of the catalyst is known and, furthermore, the amount of heat supplied to the engine is estimated. This takes place by recording the amount of fuel fed to the engine and calculating the proportion of heat energy which is fed to the catalyst. In this case, the proportion of heat energy depends on the respective load state and the speed of the engine. Consequently, the amount of heat which is fed to the catalyst is recorded for comparatively small units of time from the amount of fuel, the load and the speed. These amounts of heat are summated, in order in this way to obtain a total amount of heat which the catalyst receives from the start of the procedure. In addition, the amount of heat dissipated from the catalyst to the surroundings is estimated. The temperature estimated with this amount of heat model is subsequently compared with its actual temperature. This procedure, which is also intended to be applicable in the driving mode of a vehicle, is only started if the catalyst is at approximately ambient temperature at the beginning of the procedure. From the start of the procedure, a catalyst temperature is estimated with the aid of a temperature model block, using signals of the load, speed, injection times, air temperature, air pressure and octane number of the fuel. This temperature is compared with a stored comparison temperature. It is subsequently further investigated whether the conversion temperature of the catalyst has already been reached.

SUMMARY OF THE INVENTION

The invention is based on the object of specifying an improved monitoring procedure for the conversion rate of an exhaust catalyst of an internal combustion engine which has increased diagnostic accuracy and independence from the catalyst coating and, in addition, is independent of the operating mode of the internal combustion engine after a cold start.

Pursuant to this object, and others which will become apparent hereafter, one aspect of the present invention resides in a method for monitoring a conversion rate of an exhaust catalyst for an internal combustion engine having an electronic control device, which method comprises the steps of cold starting the internal combustion engine, determining an exhaust-gas temperature value prevailing upstream of the exhaust catalyst, detecting current temperature values of exhaust gas present downstream and upstream of the exhaust catalyst with temperature sensors at least for a duration of a specific time window after the cold start, summating the temperature of values currently present downstream of the exhaust catalyst at least during the time window to give the sum value, comparing the sum value with a limit sum value, and triggering an air signal if the comparing step shows that a specific deviation value has been reached.

The procedure according to the invention provides that, after a cold start of the internal combustion engine, the temperature values currently present downstream of the exhaust catalyst are summated during a specific time window and this sum value is compared with a predetermined limit value.

This procedure is based on the recognition that a usable catalyst differs from an unusable catalyst during the specific time window in that the better catalyst reaches its conversion temperature at an earlier point in time and thus has a higher sum value during the duration of the time window than a poorer catalyst.

The procedure utilizes the recognition that the two said catalysts do not differ significantly from each other before reaching the time window and after elapse of the time window, and therefore the exact coordination with the time window is of extreme importance for the evaluation. Also important is the starting point for the time window, since the temperature values are accumulated from this point in time. After every cold start of the internal combustion engine, the beginning of the time window is fixed in dependence on the operating mode of the engine, i.e. it is considered whether the latter is being operated in a virtually steady state or comparatively dynamically. This operating mode has a considerable influence on the amount of heat introduced into the exhaust gas, which ultimately determines the point in time at which the conversion temperature is reached. As a result, the starting point of the time window and also the time duration of the time window are fixed mode-dependently.

In an advantageous development, the exhaust-gas temperature values upstream of the exhaust catalyst are either calculated with the aid of an exhaust-gas temperature model within the control device or, alternatively, are detected directly with the aid of a temperature sensor.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
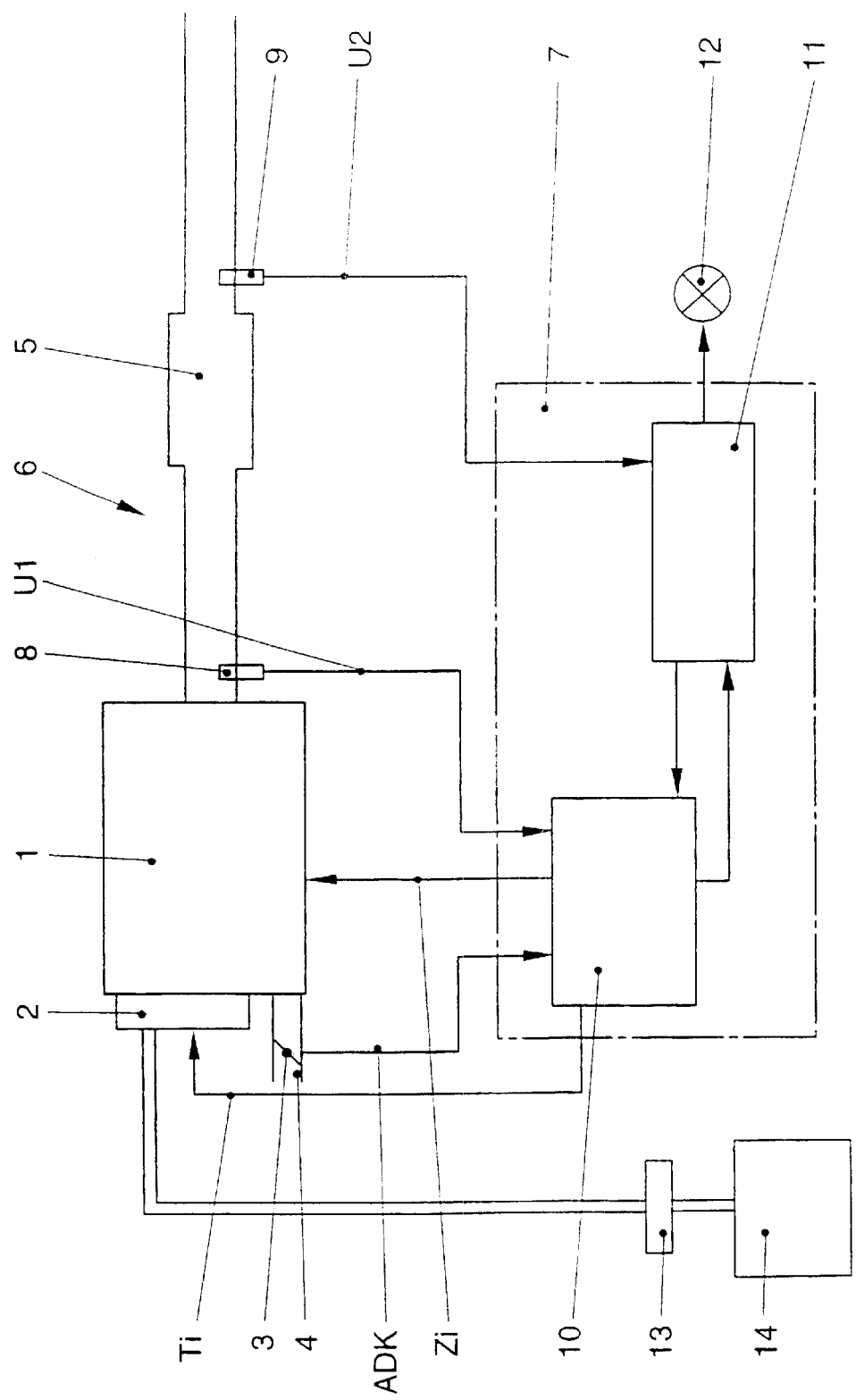
FIG. 1 shows a diagrammatic representation of an internal combustion engine having an exhaust line and an electronic control device.

An internal combustion engine 1 has injection nozzles 2, an air inlet 4, provided with a throttle valve 3, and also an exhaust line 6, provided with a catalyst 5.

An electronic control device 7, designed as an engine control unit, receives signals U1 of a first temperature sensor 8, fitted between THE internal combustion engine 1 and THE exhaust catalyst 5, and also signals U2 of a second temperature sensor 9, fitted downstream of the catalyst 5.

A control block 10 of the control device 7 receives the signal U1, a throttle-valve angle signal ADK and emits injection-timing signals T1 and also ignition-angle signals Z1 to the internal combustion engine 1.

The control device 7 also includes a monitoring block 11, to which the signals U2 of the second temperature sensor 9 are fed and which communicates with the control block 10 and, if need be, actuates a fault-signal lamp 12. This monitoring block 11 is explained in more detail in conjunction with FIG. 3.

In the operation of the internal combustion engine 1 fuel from a reservoir 14 is fed to the injection nozzles 2 by means of a fuel pump 13.

Figure 3:
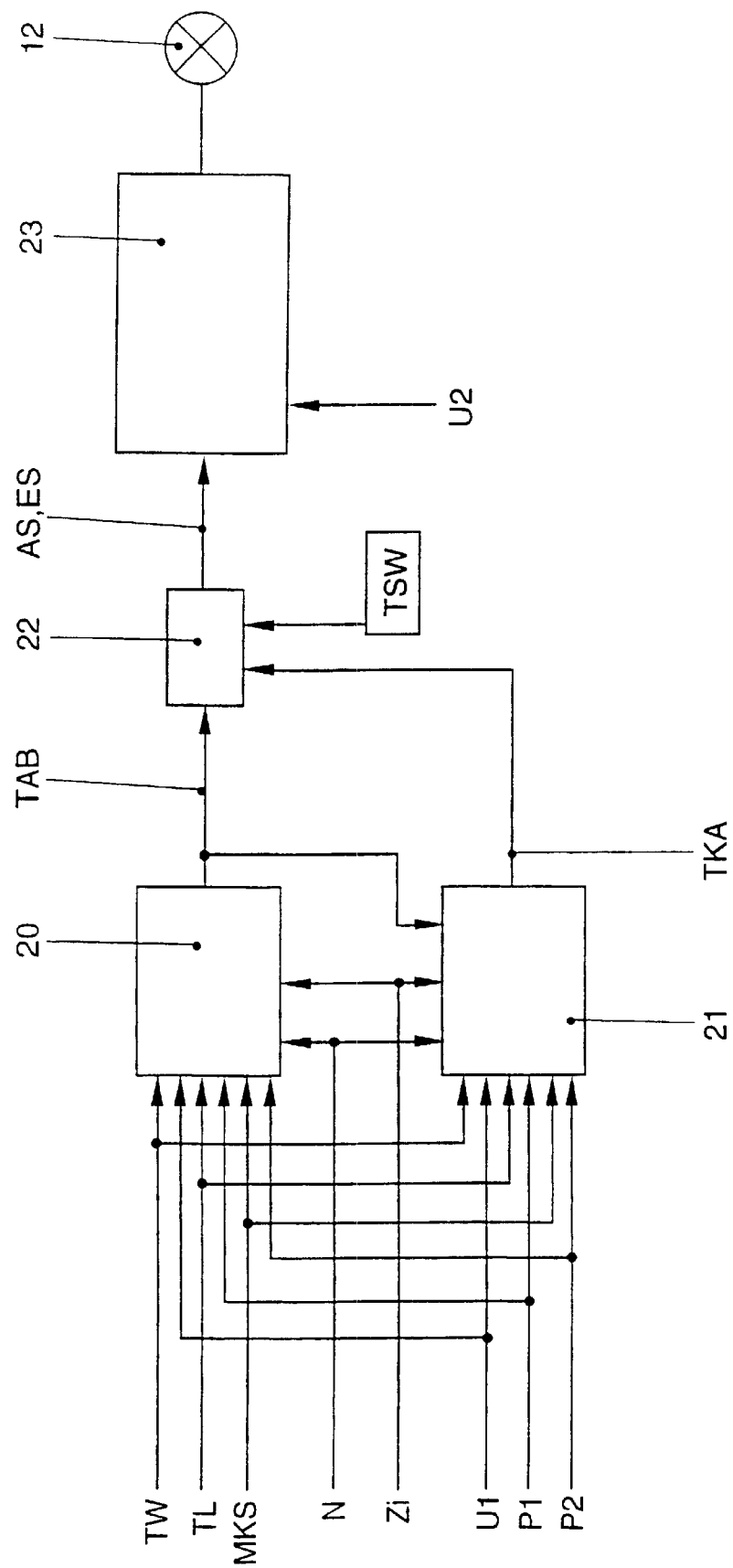
FIG. 3 shows a diagrammatic overview of part of the electronic control device.

In the detail according to FIG. 3, the monitoring block 11 comprises an exhaust-gas temperature model block 20, a catalyst temperature model block 21, a correction block 22 and an evaluation block 23.

The input variables fed to the blocks 20 and 21 are respectively signals for the water temperature TW, air temperature TL, fuel mass flow MKS, engine speed N, ignition-angle signals ZI, further variables P1, P2 ... and also signals U1 and U2 which represent the currently recorded temperature values $T_{vcat}$ upstream of the exhaust catalyst 5 and $T_{ncat}$ downstream of this exhaust catalyst 5.

The procedure proceeds as follows:

A cold start of the internal combustion engine 1 is established in a way known per se by plausibility checking of values for cooling-water temperature and/or air temperature or oil temperature etc. After establishing this cold start, first of all the exhaust-gas temperature TAB and subsequently the catalyst temperature TKA are estimated with the aid of the exhaust-gas temperature model block 20 and the catalyst temperature model block 21 using the parameters described above.

In this case, the value for TAB is set equal to the value of the water temperature TW and the air temperature TL in the exhaust-gas temperature model block 20 for the beginning of the estimation. At predetermined time intervals, the previously determined value of TAB is continually increased by a temperature difference value, adopting for this in particular the variables U1 signalling the first temperature value $T_{vcat}$, the first derivative of the traveling speed of a motor vehicle equipped with the internal combustion engine 1, the speed N, the ignition-angle signals ZI and the fuel quality in the form of the octane number.

This already makes it clear that the exhaust-gas temperature TAB estimated by this exhaust-gas temperature model block 20 depends very much on the driving cycle, i.e. on the operating mode of the motor vehicle.

For correlation with a catalyst temperature TKA, prevailing in the exhaust catalyst 5, at the same time the temperature in the region of the reaction front of the substrate of the catalyst 5 is estimated in the catalyst temperature model block 21 using the already mentioned parameters and the exhaust-gas temperature TAB. The catalyst temperature value TKA, present at the output, like the output of the exhaust-gas temperature model block 20, is fed to the correction block 22. The correction block 22 performs a correction of the value TAB, taking into account the value TKA, for forming a temperature start value TST.

If this continually renewed start value TST reaches a given temperature threshold value TSW, the correction block 22 triggers a start signal AS, which is fed to the evaluation block 23.

The temperature threshold value TSW is an empirically determined temperature value, on reaching which it can be assumed that an as-new catalyst 5 is beginning to convert. The value for TSW stored in the control device 7 can be supplemented adaptively by a variable which takes into account a currently fitted catalyst 5 in the motor vehicle.

When the start signal AS is applied to the evaluation block 23, the processing of a summing algorithm begins, for detecting a specific number of temperature values $T_{ncat}$ which is determined during a predetermined time window downstream of the catalyst 5 by the second temperature sensor 9, and further parameters.

At predetermined time intervals, new temperature values $T_{ncat}$ are continually detected and added to a sum value THC during a time span dt of the time window.

Figure 2:
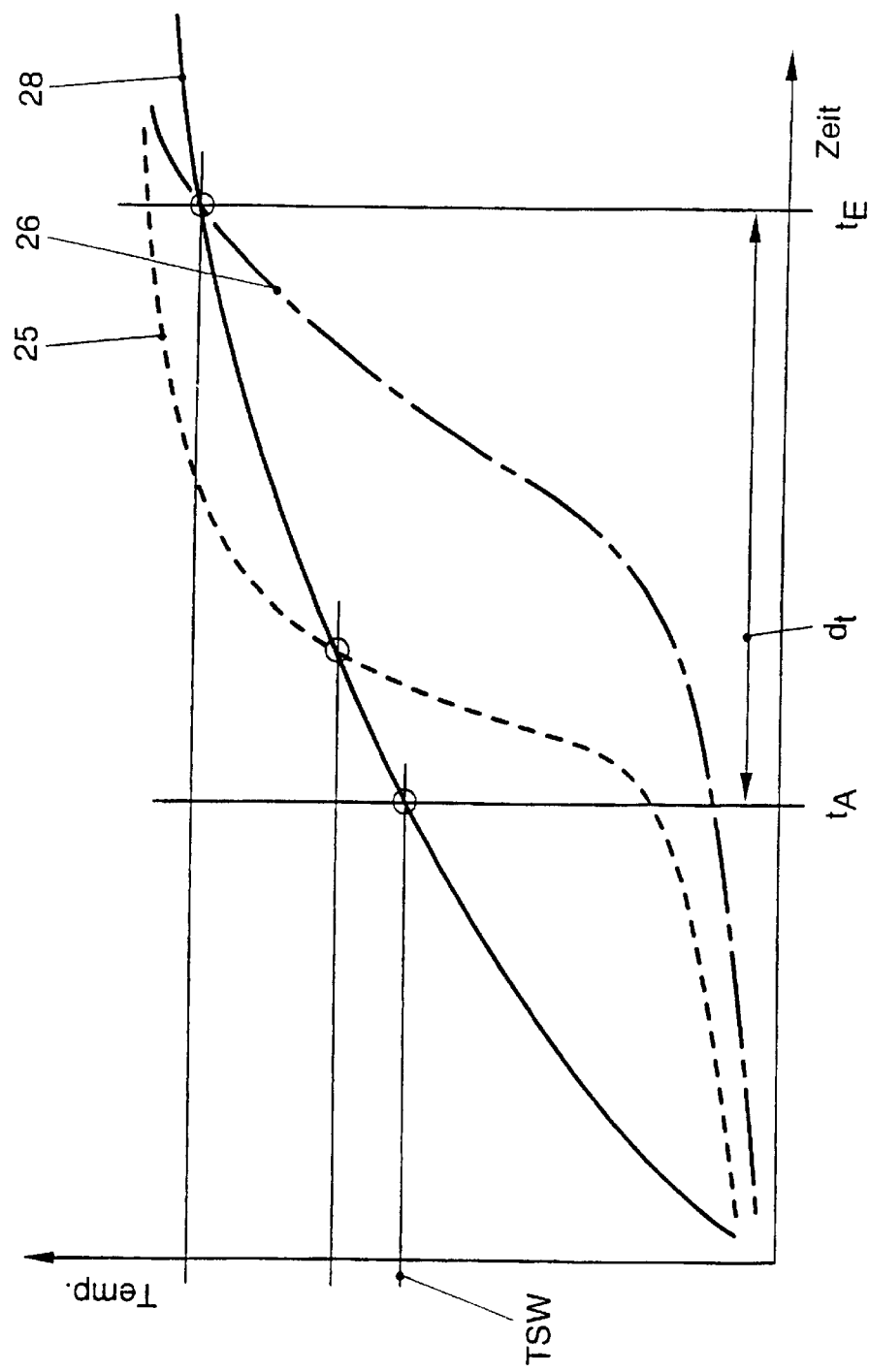
FIG. 2 shows a diagram of the variation over time of temperature values.

FIG. 2 shows the variation over time of the values $T_{ncat}$ in the exhaust gas, detected by the temperature sensor 9, over time t and the variation over time of the exhaust-gas temperature T upstream of the catalyst 5.

A curve 25 shows here the temperature profile for a new, fully functional exhaust catalyst 5. A curve 26 shows a corresponding profile for an already aged catalyst 5. It can be seen that, directly after a cold start up until reaching the starting point tA for the time window extending over the time span dt, there are no significant differences between the curve profiles 25 and 26. This time range is consequently unsuitable for reliable detection of a possibly damaged catalyst.

A curve 28 shows the variation over time of the exhaust-gas temperature T upstream of the catalyst 5 in this case, therefore, the exhaust-gas temperature value TAB. On reaching the temperature threshold value TSW, as from the starting point tA the temperature values $T_{ncat}$ are summated during the time span dt to give a sum value $TT_{ncat}$.

A sum value $TT_{ncat}$ 1, determined after starting the internal combustion engine 1 for the first time with the respectively fitted catalyst 5, is stored in the control device 7 as a reference value. When in a workshop, this value can be read out for diagnostic purposes and used to assess the quality of the catalyst used.

During the service life of the combination of the internal combustion engine 1 and the exhaust catalyst 5, the conversion properties of the latter deteriorate, one of the effects being that the temperature required for the conversion increases, i.e. harmful exhaust emissions increase.

The curve 26 according to FIG. 2 shows the typical emission profile downstream of such an aged catalyst. The area corresponding to the sum value $TT_{ncat}$ below the curve profile 26 within the time window is significantly smaller than that below the curve 25.

The summating of the temperature values Tncat is ended when the correction block 22 emits a stop signal ES to the evaluation block 23. The end of the time window is determined by the starting point tA and the time span dt. This in turn is made up of an empirically determined preset average value tM and a correction value tK, dependent on parameters of the internal combustion engine 1.

The parameters used for the determination of the exhaust-gas temperature values TAB, the catalyst temperature values TKA and the correction value tK are those which in particular take into account the driving mode with which the motor vehicle is operated. As a result, the individual driving cycle is reduced to a standardized driving cycle and can be compared with such standardized cycles. Such cycles are prescribed by legislation in various countries around the world, for example as the so-called FTP cycle or else MVEG cycle. These prescribed cycles have a precisely defined speed profile over time, i.e. the driving cycle is exactly specified.

The influence of the driving-cycle-dependent parameters, such as for example the fuel mass flow MKS per time unit, is manifested according to the procedure by the time span dt being shortened with increasing values for the fuel mass flow MKS per unit of time. This is advantageous to the extent that the energy introduced through the increased fuel mass flow MKS heats up the catalyst 5 quicker and, as a consequence of this, the curve profile 26 is shifted to the left in the region of the time window in FIG. 2, so that, if the original time span dt is retained, the insignificantly different section of the curve profiles 25 and 26 after the end point tE would become increasingly noticeable.

For a further improvement in the accuracy of the procedure, the starting point tA can be shifted in the direction of early as a function of the driving-cycle-dependent parameters, for example with increasing fuel mass flow MKS per time unit.

In the evaluation block 23, a limit value GTT for the sum value $TT_{ncat}$ is stored. This limit value GTT can be set country-specifically, for example, and represents a catalyst 5 considered to be still tolerable. If the comparison of $TT_{ncat}$ and GTT shows that a specific deviation value DT has been reached, an error signal is triggered, which after occurring once or more than once actuates the fault-signal lamp 12.

The previously described procedure advantageously offers better diagnostic accuracy than previously known procedures and is, in addition, independent of the catalyst coating; furthermore, lead-poisoned catalysts can also be detected. of decisive importance for the procedure according to the invention is the setting of the start signal AS and the duration of the time span dt.

The procedure according to the invention consequently ultimately compares the temperature values $T_{ncat}$ downstream of the exhaust catalyst 5 with the total heat energy introduced into the exhaust line. This energy actually introduced is normalized by the driving-cycle-independent evaluation and could be equivalently plotted in FIG. 2 on the x-axis instead of time t. The procedure identifies operational exhaust catalysts 5 in a reliable way from the size of the area integral underneath the curve profile 25 in the time window. The greater this area integral, the better the properties of the exhaust catalyst 5 with respect to the conversion rate. Consequently, the comparatively low position of the point of intersection between curve profiles 25 and 28 also correlates, i.e. an operational exhaust catalyst 5 is at a significant distance from the point of intersection of the already aged catalyst, cf. curve profile 26 in FIG. 2.

What is claimed is:

1. A method for monitoring a conversion rate of an exhaust catalyst for an internal combustion engine having an electronic control device, comprising the steps of:

a) cold starting the internal combustion engine;

b) determining an exhaust-gas temperature value (TAB) prevailing upstream of the exhaust catalyst;

c) detecting current temperature values ($T_{vcat}$, $T_{ncat}$) of exhaust gas present downstream and upstream of the exhaust catalyst with temperature sensors at least for a duration of a specific time window after the cold start, step c) including, in the control device for the beginning of the time window, c1) determining a catalyst temperature value (TKA), c2) correcting the exhaust-gas temperature value (TAB) with a catalyst temperature value (TKA) to form a temperature start value (TST), then in one step, c3) triggering a start signal (AS) of a starting point (tA) of the time window if the temperature start value (TST) has reached a given temperature threshold value (TSW);

d) summating the temperature values ($T_{ncat}$) currently present downstream of the exhaust catalyst at least during the time window to give a sum value ($TT_{ncat}$);

e) comparing the sum value ($TT_{ncat}$) with a limit sum value (GT); and f) triggering an error signal if the comparing step shows that a specific deviation value (DHC) has been reached.

2. A method according to claim 1, further including storing the sum value ($TT_{ncat}$) determined in step d) as a reference value a first time the internal combustion engine is operated together with the exhaust catalyst.

3. A method according to claim 1, including estimating the catalyst temperature value (TKA) determined in step c1) in a catalyst temperature model block of the control device.

4. A method according to claim 1, further including triggering a stop signal (ES) for an end of the time window at an end time point (tE) when there has elapsed since the starting point (tA) a time span (dt) which is made up of a preset average value (tM) and a correction value (tK), dependent on parameters of the internal combustion engine.

5. A method according to claim 4, further including detecting parameters dependent on a driving cycle as parameters of the internal combustion engine.

6. A method according to claim 5, including detecting fuel mass flow as the engine parameter.

7. A method according to claim 6, including shortening the time span (dt) with increasing values for the fuel mass flow (MKS) per time unit.

8. A method according to claim 7, including shifting the starting point (tA) in a direction of early with increasing values for the fuel mass flow (MKS).

9. A method according to claim 1, wherein step b) includes detecting the exhaust-gas temperature value (TAB) directly as the current temperature value ($T_{vcat}$) by means of a first temperature sensor.

10. A method according to claim 1, wherein step b) includes determining the exhaust-gas temperature value (TAB) in an exhaust-gas temperature model block of the control device as a function of parameters of the internal combustion engine.

* * * * *